United States Patent
Schneider

(10) Patent No.: US 7,376,610 B2
(45) Date of Patent: May 20, 2008

(54) COMPUTERIZED METHOD AND SYSTEM FOR SCORE BASED EVALUATION OF CAPITAL MARKET INVESTMENT DECISIONS AND STRATEGIES

(75) Inventor: Jens-Uwe Schneider, Frankfurt am Main (DE)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 09/881,346

(22) Filed: Jun. 14, 2001

(65) Prior Publication Data

US 2003/0004846 A1    Jan. 2, 2003

(51) Int. Cl.
*G06F 17/60* (2006.01)

(52) U.S. Cl. .......................... 705/36; 705/35; 705/37; 342/25

(58) Field of Classification Search ............ 705/35–37; 342/25

See application file for complete search history.

(56) References Cited

U.S. PATENT DOCUMENTS 6,317,726 B1 * 11/2001 O'Shaughnessy ......... 705/36 R
7,206,760 B1 * 4/2007 Carey et al. ............... 705/353

OTHER PUBLICATIONS

The fast-growing market for European high-yield bonds, Jens-Uwe Schneider, pp. 1-4, undated.
Corporate finance and investment decisions and strategies, Richard Pike et al., undated.
The Pricing of Initial Public Offers of Corporate Straight Debt, Sudip Datta, et al., pp. 379-397, undated.

* cited by examiner

*Primary Examiner*—Harish T. Dass
(74) *Attorney, Agent, or Firm*—David L. Adour; Hoffman, Warnick & D'Alessandro LLC

(57) ABSTRACT

The disclosed computer-implemented investment management process particularly in the field of high yield corporate bond financial market consists of five distinct process phases. In a first phase, the financial market under evaluation is researched in order to obtain all the market business information necessary for the following market evaluation phases. The next three phases, as marked by the dotted line, are all part of the central evaluation process that will be described in more detail hereinafter. The first evaluation phase is a filtering phase where the market business information obtained from the previous research phase are filtered in order to separate useful information from non-useful information. In a following phase, the filtered business information at first is input to a subscoring process and thereafter to a scoring process. Finally, the obtained evaluation results (scores) are presented to a user in form of a recommendation displayed on a monitor or printed in paper format.

10 Claims, 6 Drawing Sheets

The Financial Market for HY Corporate Debt

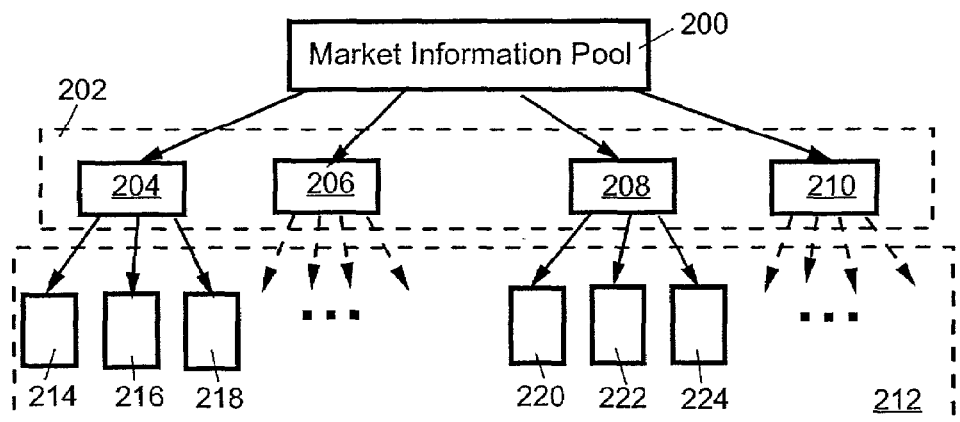
FIG. 4
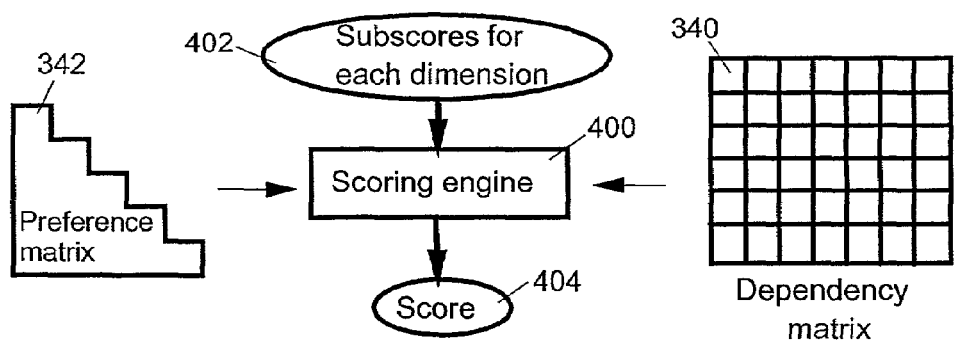
FIG. 6
|   | A | B | C | D |
|---|---|---|---|---|
| A | X | X | X | X |
| B | A |   | X | X |
| C | 3A | C | X | X |
| D | A | D | D | X |
FIG. 8

|  | Market Position | Financial Position | HY Bond Features | Fundamental Condition | Technical Condition | Political Condition | Investors Appetite | Demand Competition | Investors Substitutes | Companies Substitutes | Supply Competition | Investment Banks |
|---|---|---|---|---|---|---|---|---|---|---|---|---|
| Market Position | Z | N | Y |  |  |  | X |  |  |  |  | X |
| Financial Position | N | Z | X | Y |  |  | X |  |  | X |  | X |
| HY Bond Features | Y | X | Z | Y | Y | Y | Y | Y | Y | Y | Y | Y |
| Fundamental Condition |  | Y | Y | Z | N | Y | X | X | X | X |  | X |
| Technical Condition |  |  | Y | N | Z | Y | X | X | X |  | X | X |
| Political Condition |  |  | Y | Y | Y | Z | X | X | Y | X |  | X |
| Investors Appetite | Y | Y | X | Y | Y | Y | Z | X | Z |  |  | N |
| Demand Competition |  |  | X | Y | Y | Y | Y | Z | N | Y | X | N |
| Investors Substitutes |  |  | X | Y | Y | Y | X | N | Z | Z |  | Y |
| Companies Substitutes | Y | Y | X | Y |  | Y |  | Y |  | Z | N | Y |
| Supply Competition | Y |  | X | Y | Y | Y | N | N | Y | N | Z | Y |
| Investment Banks | Y | Y | X | Y | Y | Y | Z | N | X | X | N | Z |

Legend

Z = mutual dependence on each other (bijective relasion)
1X = Low degree of dependency
2X = Medium degree of dependency
3X = High Degree of dependency X = Output
Y = Input

FIG. 7

IF SCORE -- THEN RECOMMEND FOLLOW.INVESTM.DECISION

< 20%     NO INVESTMENT (under no circumstances)
20 - 40%   NO INVESTMENT (but another individual
                         review of score necessary)
40 - 80%   DO INVESTMENT (but personal summary necessary)
80 - 100%  STRONGLY DO INVESTMENT (no further work
                                    neccessary

COMPUTERIZED METHOD AND SYSTEM FOR SCORE BASED EVALUATION OF CAPITAL MARKET INVESTMENT DECISIONS AND STRATEGIES

BACKGROUND OF THE INVENTION

The present invention generally relates to the field of capital market investment instruments and more specifically to a computer-implemented method and system for score based evaluation of investment decisions and strategies particularly in the field of high yield corporate bond financial market.

Generally speaking, bonds are loans to companies or governments. Purchasing a bond means lending money for that company's or government's survival, thus receiving regular interest payments for the use of your money.

High yield bond issuance recorded a dramatic growth during the last couple of years, not only in the US, but also in Europe and Canada. At the same time, default rates crept higher and investors' returns suffered from a sharp drop in liquidity during the third quarter. Looking forward, investors avidly desire the incremental returns provided by non-investment grade corporate debt. At the same time, they are concerned about the possibility of an economic slowdown and its potentially adverse impact on the equity values that provide the credit cushion beneath their bonds.

Nevertheless, an investment objective particularly in the field of high yield corporate bonds, e.g. using corresponding investment funds, is seeking maximum current income through investment in a diversified portfolio of high yield debt securities. Hereby capital appreciation is a secondary objective.

Knowing how a particular investment decision or strategy performed historically gives one the vital information one needs on its risk, variability, and persistence of returns. In the past, it took the combination of fast computers and huge databases to obtain an assessment for an investment decision or strategy. Often those decisions and strategies are made without use of a computer where it is almost impossible to determine what strategy guided the development of a capital market. The number of underlying factors, e.g. price-to-earnings ratio or dividend yield, that an investor could consider seemed endless. Thus the best one could do was look at portfolios in the most general ways.

There exist several capital market investment management approaches developed for manufacturing or services industries. In particular, investment instruments like securities such as high yield (HY) bonds are products with demand and supply factors only they are traded on financial markets. Unique to HY bonds is the very important role of financial institutions, who act as intermediaries to match the needs of lenders and borrowers. Their role is crucial for financial markets to operate efficiently. The product HY bond is provided by corporations in need of money, but the service 'Issuing and placing HY bonds' is inevitably linked to the financial advice and know-how of investment banks. Today no corporation could issue a HY Bond by itself; the issue is distributed for them to the lenders of money. These financial institutions are essential to re-package finance i.e. small amounts of savings from a large number of individuals and re-packaging them into larger bundles for lending to businesses, in order to reduce risk by placing small sums from numerous individuals in to large, well-diversified investment portfolios, such as unit trusts, to transform liquidity by bringing together short-term savers and long-term borrowers, e.g. building societies and banks, and to minimize transaction costs by providing convenient and relatively inexpensive services for linking small savers to large borrowers (Pike and Neale (1999), Corporate Finance and Investment, $3^{rd}$ edition, U.K., Prentice Hall).

A known approach for analyzing a capital market is Porters five-forces analysis (Porter, M. E. (1979) "How competitive forces shape strategy", Harvard Business Review 52(2), 1979) which is applied as follows. The object for the analysis is the product-service package of HY bonds. The rivalry between these packages is amongst investment banks to be most the successful in issuing HY bonds. These HY bonds are supplied by corporations and the buyers are principally the above mentioned financial institutions. FIG. 1 visualizes the underlying relationships. The analysis considers only HY corporate bonds as a sub-segment of corporate bonds as part of the debt capital market. The emphasis is on the primary market from an investment bank's perspective.

In addition, financial consultancies such as PriceWaterhouseCoopers, KPMG and Ernst & Young have already built up financial advisory services, including specialized corporate finance departments competing directly with investment banks.

To compete successfully in the HY bonds market, the reputation of the investment banks plays a crucial role. Datta, Iskandar-Datta and Patel (1997), for example, found that the degree of under-pricing for bond IPOs (Initial Public Offerings), like stock IPOs, is inversely related to the reputation of the investment bank. Fridson (1990) adds another line of competition—the liquidity in the secondary market. It is important to attract regular market makers in addition to the original underwriter. Only competing market makers ensure sufficient validity of price quotations, because price variability declines in a market for small, illiquid issues that trade only on a workout basis. Fridson mentioned a minimum size of about USD 60 m. Furthermore, investment banks must support their deals in the aftermarket, which in turn necessitates a well-capitalised secondary trading effort.

In conclusion it is important for an investment bank to find the right balance between maintaining liquid markets, profitably trading on their own and other issues, and reasonably constraining risks.

Another perspective relates to the individual type of investor. Datta et al. (Datta et al., "The Pricing of Initial Public Offers of Corporate Straight Dept, Journal of Finance, Vol. 52, Issue 1, March 1997) argues that investment grade issues are sold exclusively on bond rating to investors who are interested primarily in safety of the principal and not in appreciation of price. On the other hand, not unlike equity offerings, HY issues are sold based on stories that relate to future prospects of the firms. Generally speaking, three types can be differentiated: Trading oriented investor, long-term investor and retail investor. Retail investors, e.g. individuals and corporations, will mainly buy the HY bond and hold it until redemption. Long-term investors take typically a very long-term view of about 7-10 years. Insurance companies and pension funds are amongst them. Trading-oriented investors such as HY mutual funds, hedge funds, broker dealers and banks continuously observe the market looking for profit opportunities. Probably most mutual funds are managed actively trying to beat the market. They aim to prevent negative credit drifts (downgrades or defaults) and benefit from undervalued bonds, which have up-grade potential in one way or another. In order to achieve their goals enormous efforts to overcome information asymmetry against investment banks is undertaken. Datta et al.

(1997) studies acknowledge that institutional investors are generally well-informed and informational asymmetry is expected to be limited. As a result these better informed companies are better able to bargain.

Considering the inability of insurance companies and funds to integrate backwards lowers their bargaining power. Furthermore the position of banks as advisors of HY issues, customers and main distribution channel is taking power away from other customers. Banks are already forward integrated giving them an advantage in bargaining. In addition, the many HY funds are specialized only in HY bonds, thus having virtually no substitutes. In favour of the customers is their huge size; sometimes hundreds of millions managed by only one fund. The bigger the purchases of buyers and the smaller their number, the greater the cost of loosing one customer.

Apart from the relative bargaining power the buyer's price sensitivity determines the strengths of buying power. Here the great importance of the HY issues to the performance of the HY funds etc. and the comparatively low differentiation of HY issues lead to a high degree of price sensitivity. Adding the fierce competition amongst funds to attract investment enlarges this trend.

In conclusion, the economic power of the customers compared to investment banks is relatively strong, thus lowering the profit potential for investment banks. In particular, HY funds drive already the European HY market and will grow stronger. While the European fund sector is estimated to be worth more than Euro 2,000 bn and is expected to triple by 2005 it is still fragmented. Wall Street Journal (Oct. 20, 1999) published that of the 12,000 funds in the EU only around 3,500 could be deemed to be truly cross border. 7,000 funds are pure domestic vehicles. Thus, the European HY market consists more of several national HY markets but as funds and other investors grow pan-European, the market will lose its borders immediately.

Summarizing, the few HY issuers face about two dozen investment banks. Because the banks cannot integrate backwards and the companies cannot integrate forwards, here the status quo in terms of bargaining power remains. On the other side, companies totally depend on the ability to place the issue and look after it in the secondary market. Furthermore, investment banks watch closely their market reputation and need to have successful HY issues, thus looking closer at the company's accounts and future prospects. Taking into account that there is growing competition amongst investment banks to enter or to retain a good position within this profitable area gives companies the opportunity to choose. On balance, companies with a good market position and good future prospects have considerable bargaining power with respect to choosing an appropriate investment bank. When it comes to pricing and placing the issue, these companies depend totally on the know-how of banks, lowering their influence considerably vis-à-vis ensuring the overall success of an issue.

The predescribed high-level assessment is based on a rough market analysis of the underlying market structure and the corresponding market players. Following to that is required a low-level evaluation of each player, the relevant market forces, etc. These market evaluation steps altogether required to come to an investment decision particularly in the field of HY bonds are very complex and thus require considerable resources (human, machines etc.) and time and cost efforts to be performed and, due to lack of any computer assisted or implemented solution, often do not reveal consistent and satisfying results.

In addition, the corporate bond market history disadvantageously shows that the traditional active management tools particularly for managing high yield corporate bond market investments does not work in an efficient and consistent way, in particularly over a longer time period. Since the magnitude of the sums involved and the complexity of the relevant investment information, it is very desirable to use an objective rule-based strategy for automating, to the extent practicable, the conduct of this decision making.

SUMMARY OF THE INVENTION

It is therefore an object of the present invention to provide improved and automated management of capital market financial assets.

It is another object to provide computer-implemented assistance or support investment decisions and strategies, particularly in the field of corporate bonds.

Another object is to provide such assistance or support for investment decisions and strategies in the field of high yield corporate bonds.

It is yet another object to provide such an asset management that meets the complexity of the aforementioned decision process.

Still another object is to provide an according computerized or computer implemented business process starting with capital market/economic research until an investment decision making.

The above objects are achieved by the features of the independent claims. Advantageous embodiments are subject matter of the subclaims.

The proposed method provides n different evaluation areas and m determinants (dimensions) within these n areas. It is recognized hereby that the HY corporate bond market can best be evaluated by looking at four interlinked areas. According to a preferred embodiment, the four interlinked areas each comprise three criteria to be evaluated thus altogether revealing twelve criteria. The four interlinked areas preferably relate to (i) an individual HY issue position, (ii) an HY market and industry condition, (iii) an HY demand status, and (iv) an HY supply status. The twelve criteria for the HY bond market evaluation are preferably based on the following criteria or items:
  (i) Market position, financial position and HY bond features;
  (ii) Fundamental condition, technical condition and political condition;
  (iii) Investor's appetite, demand competition and demand substitutes; and
  (iv) Supply substitutes, supply competition and Investment banks.

According to another aspect of the invention, the invention provides a computerized process that divides into a first sub-process of analysis of HY issues and market conditions and a second sub-process of analysis of market structures, players and forces. The underlying generic model captures all important determinants influencing the HY market.

According to still another aspect, the above evaluation process is mapped onto a general scoring process consisting of four evaluation phases or stages is provided. In a first phase, the determinants to consider, e.g. investment banks, and the sub-processes, by looking at the determinants, are defined. Further the dependencies between the defined determinants are identified. In a second phase, the determinants are weighted whereby defining the relative importance of each determinant. In particular, the weighting is based on a preference matrix wherein each determinant is weighted with each determinant. Further, in the second stage, possible score ranges of e.g. 1 to 10 are defined. In a third phase of the process, the defined determinants are analyzed and scored. Hereby, at first, information concerning the above mentioned criteria is collected and then a score for each determinant determined. Afterwards, the determined dimensional scores are multiplied times the defined weights of each determinant and finally the scores of each dimension are added to obtain an overall score. In a fourth phase, all score intervals are defined and sets of possible recommendations are determined. At the end of the process, the possible recommendations are linked to intervals.

The proposed HY evaluation process allows to visualize key determinants and developments in a standardized and generalized manner. As a result, it thereupon provides only an assertive single score corresponding to the final assessment for an investment decision.

Thus, in a preferred embodiment, a computer-implemented visualization (checklist) and an automated score generator are provided. The checklist can be implemented as a computerized radar scheme wherein evaluation of the HY market is performed in each direction of a radar scheme. The score generator is based on a novel model used for automated strategic analysis. In order to reflect external trends and their influence on the HY market, the computerized checklist includes two snapshots: one reflecting the current status of the HY market and another reflecting a future status, both included in the checklist. The provided checklist may be the basis for a human decision to invest. Alternatively, the list may be the basis for a computer to make investment recommendations or generate paper or electronic orders to initiate an investment order transaction or the like. In this embodiment, the score generator, as a result of a HY market analysis, provides a one-dimensional score which can be compared with a certain upper or lower threshold. If that score exceeds the upper or lower threshold, an automated call or put transaction, respectively, can be triggered automatically.

In another embodiment, the m different dimensions are weighted on a scale from e.g. 1 to 10. The lowest number 1 is reserved only for the limitation to a positive development of the HY market. Number 10 expresses strongest facilitation for a prospering HY market. The middle of the scale, number 5, represents a neutral status regarding the HY market.

The present invention may be utilized on a general purpose computer, such an IBM Personal Computer or other computer or workstation known to those in the art. Additionally, the areas and criteria could be encoded onto special purpose chips for creating special purpose hardware for carrying out the present invention. The present invention could be implemented on a wide area network, local area network, through a dial-up connection to a dedicated machine, through an internet or intranet connection.

BRIEF DESCRIPTION OF THE DRAWINGS

In the following, the invention will be described in more detail by way of a preferred embodiment whereby referring to the accompanied drawings from which further features and advantages of the invention become evident. In the drawings, similar features or features equally in their function are designated with identical reference signs. Hereby

FIG. 4 is a detailed view of the filtering stage depicted in FIG. 2;

FIG. 6 is a detailed view of the scoring stage depicted in FIG. 2;

FIG. 7 is a preferred dependency matrix for handling interdependencies between the different determinants shown in FIG. 4;

FIG. 8 is a preferred preference matrix as part of the process model depicted in FIG. 3;

DETAILED DESCRIPTION OF THE PREFERRED EMBODIMENT

Figure 1:
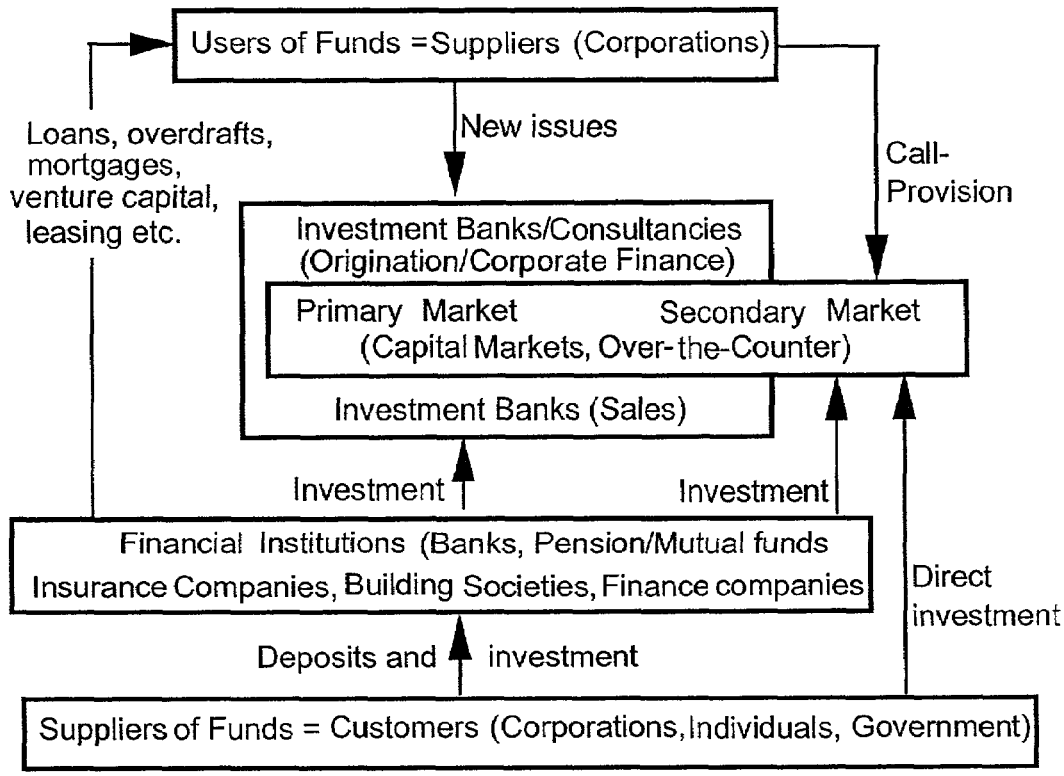
FIG. 1 shows a model of the Financial Market for high yield (HY) Corporate Debt, adapted from Pike and Neale (1999), Corporate Finance and Investment, $3^{rd}$ edition, U.K., Prentice Hall.

FIG. 1 depicting a model of the Financial Market for high yield (HY) Corporate Debt is already described in the introductory part of this specification.

Figure 2:
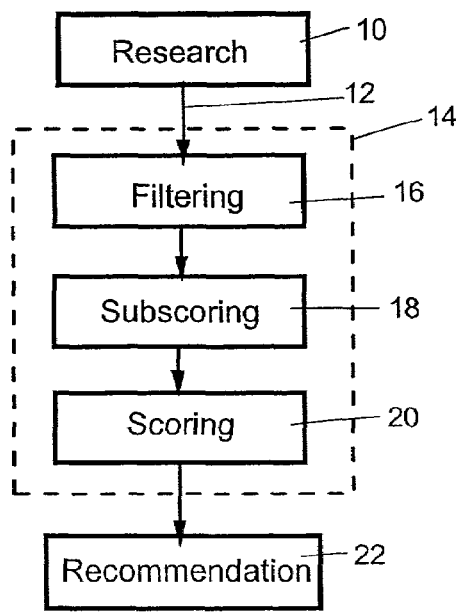
FIG. 2 shows phases of a score based investment decision process according to the invention.

As shown in FIG. 2, the investment decision process according to the invention consists of five distinct process phases. In a first process phase, the financial market under evaluation is researched 10 in order to obtain all the market business information 12 necessary for the following market evaluation phases. The next three phases, as marked by the dotted line, are all part of the central evaluation process 14 that will be described in more detail hereinafter. The first evaluation phase is a filtering phase 16 where the market business information obtained from the previous research phase 10 are filtered in order to separate useful information from non-useful information. In a following phase, the filtered business information at first is input to a subscoring process 18 and thereafter to a scoring process 20. The subscoring process 18 and the scoring process 20 are described in more detail referring to FIGS. 3, 5 and 6. Finally, the obtained evaluation results (scores) are presented to a user in form of a recommendation 22 displayed on a monitor or printed in paper format.

It should be mentioned that the final recommendation process 22 is necessarily based on an existing business analysis (evaluation) model, as will be discussed in the following. It is further noted that the research phase 10 is not regarded to be a necessary part of the invention. Alternatively, the required market business information 12 can be gathered from an existing information database or the like. Accordingly, the recommendation phase 22 can be implemented in any form, as mentioned above.

Figure 3:
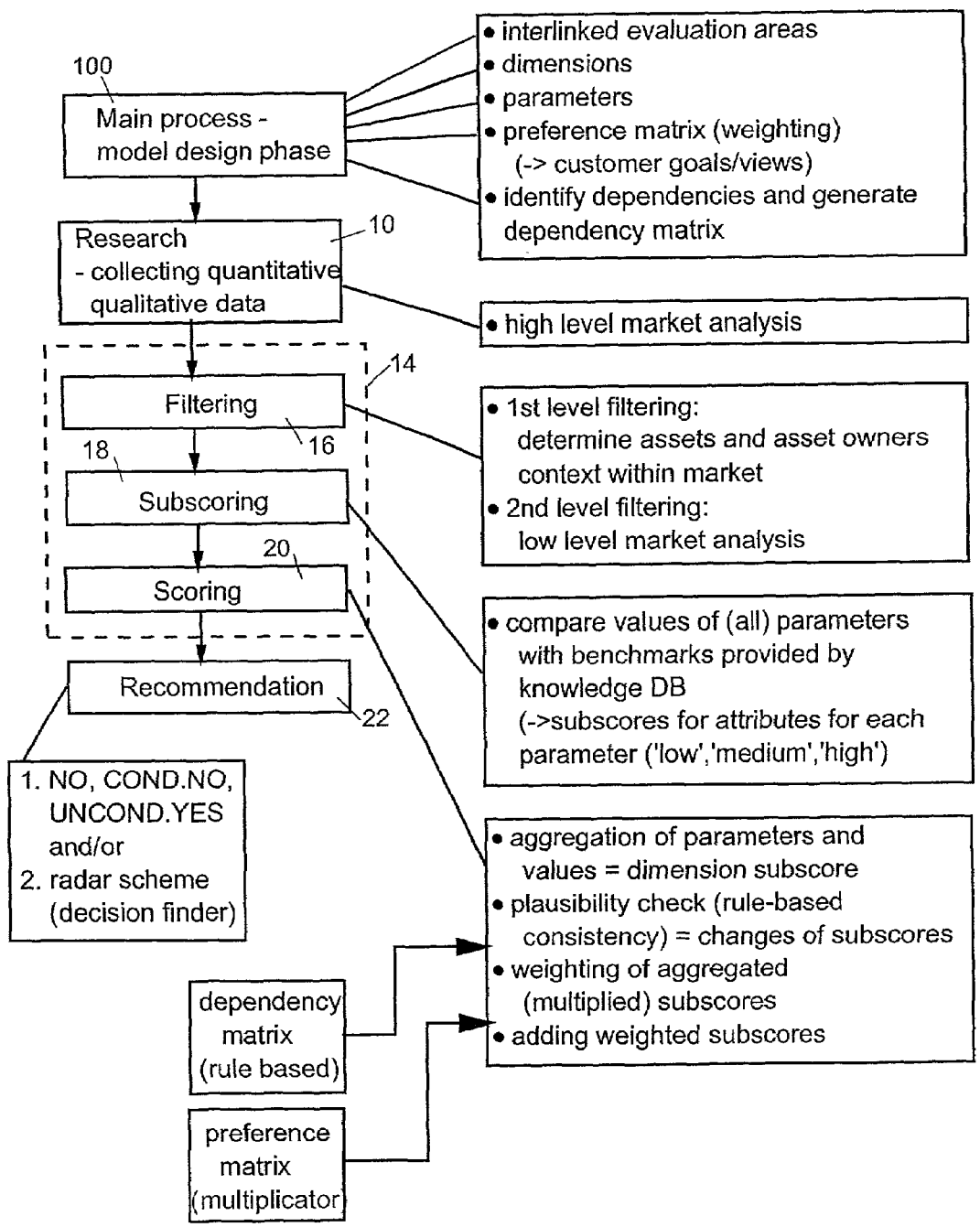
FIG. 3 detailed process steps of the score based investment decision process depicted in FIG. 2.

FIG. 3 gives a detailed overview about all process stages and steps for initiating and running the subject evaluation process, including the predescribed five phases 10-22 referring to FIG. 3. At the beginning of the main process, a business market evaluation model has to be designed 100 where evaluation areas and their interlinkage are defined and where the number of dimensions or determinants used in each of the evaluation areas or in all areas is defined. Further a number of parameters which have to be evaluated under the model are predefined. In order to enable weighting of these parameters lateron during the evaluation process, a so-called 'preference matrix' (FIG. 8) in the preferred embodiment including customer goals and views concerning the financial business market under evaluation. In addition, dependencies between the predefined determinants are identified and put into a so-called 'dependency matrix' (FIG. 7).

After the model is designed, the already mentioned research phase 10 is started where a high level market analysis is performed by collecting quantitative and qualitative business market data. In the following filtering or information clustering phase 16, on a first rough filtering level assets and asset owners within the market are determined in view of the context of the underlying market compared to other markets for the underlying evaluation model.

The output of the clustering into one of the four interlinked areas is used further as input for a second level filtering. On the second more precise filtering level, a low level market analysis is performed. Hereby, to all parameters a value is assigned. The output of the second level clustering of all parameters and corresponding values is input into determinants.

In the following subscoring phase 18, the values of all parameters are compared with corresponding benchmark values provided by a knowledge database and each parameter is asigned a subscore for its attribute like 'LOW', 'MEDIUM' or 'HIGH'. Based on the determined subscores, in the following scoring phase 20, the basic input information is the predescribed rule-based dependency matrix and the preference matrix, the latter providing multiplicators used for weighting the determined subscores.

All parameters and values are aggregated within the clustered dimensions and dimension subscores are calculated. Further a plausibility or consistency check is performed for the determined subscores and, if necessary, one or more subscores be changed accordingly. The aggregated subscores are weighted using the mentioned multiplicators and finally, the weighted subscores are added thus revealing final scores for each determinant or dimension, respectively.

Figures 9, 10:
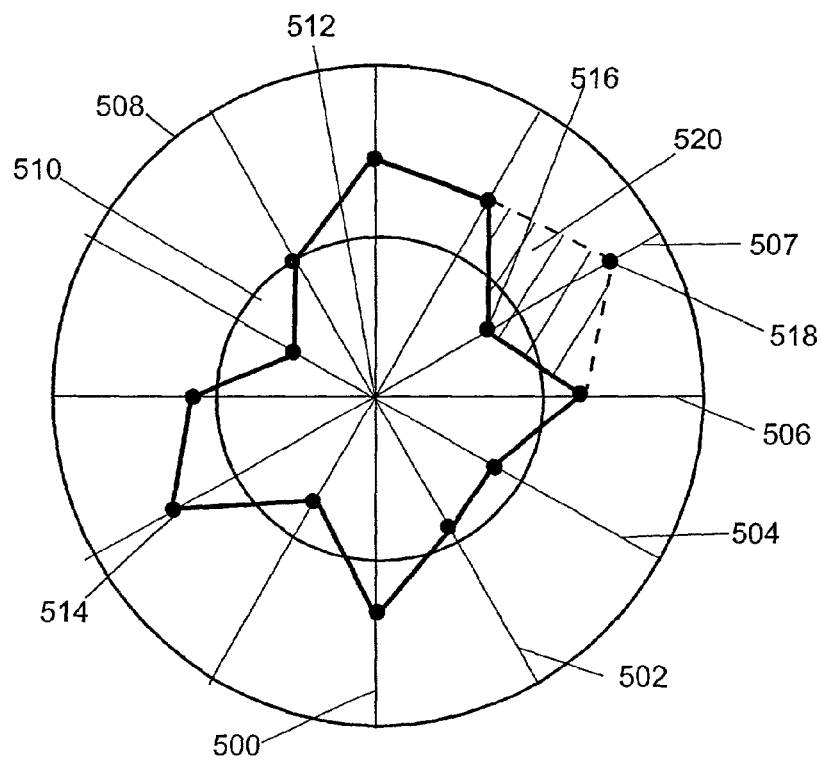
FIG. 9 is a schematic view of an exemplarily recommended investment decision based on a score calculated according to the invention.
FIG. 10 shows an exemplary output of the investment decision process according to the invention using a radar scheme.

Based on the final scores, in the recommendation phase 22 a final recommendation for HY bond investment like 'NO', 'CONDITIONALLY NO', or 'UNCONDITIONALLY YES' is created. Optionally, the decision finding can be enhanced using a so-called 'radar scheme' as depicted in FIG. 10.

Now referring to FIG. 4, the filtering phase or stage 16 of the entire evaluation process is shown in more detail. In the preferred embodiment, starting with a pool 200 of complex market data/information on top of the structure, e.g. provided by a knowledge database or the like, there is a first layer 202 providing high level filtering of the gathered market information. In this level, the data will be assigned to one of a number of containers, in the preferred embodiment four containers 204-210. As mentioned in FIG. 3, these containers 204-210 contain assets and asset owners within the market in view of the context of the underlying market compared to other markets for the underlying evaluation model. These assets, in the preferred embodiment, are the current market condition of HY Issues, the current market and industry condition, the current market supply status and the current market demand status.

The roughly clustered information provided by the first layer 202 is input to a second layer 212 that provides more precise (low level) filtering, in the following referred to as determinants, namely in the preferred embodiment twelve determinants from which, for simplification purposes, only determinants 214-218 and 220-224 are shown in FIG. 4. In the preferred embodiment, the determinants of the first container 204 are related to market position, financial position and HY bond features. The determinants of the second container 206 relate to fundamental condition, technical condition and political condition. The determinants of the third container 208 relate to investment banks, supply competition and companies substitutes. And the determinants of the fourth container 210 relate to investors substitutes, demand competition and investors appetite. On the second filtering level, a low level market analysis is performed. Hereby, to all parameters a value is assigned. It is noted that the output of the second layer is input to a subscoring engine for performing the necessary subscoring steps as described beforehand. As a result, the second layer reveals parameters for each of the determinants 214-224.

Figure 5:
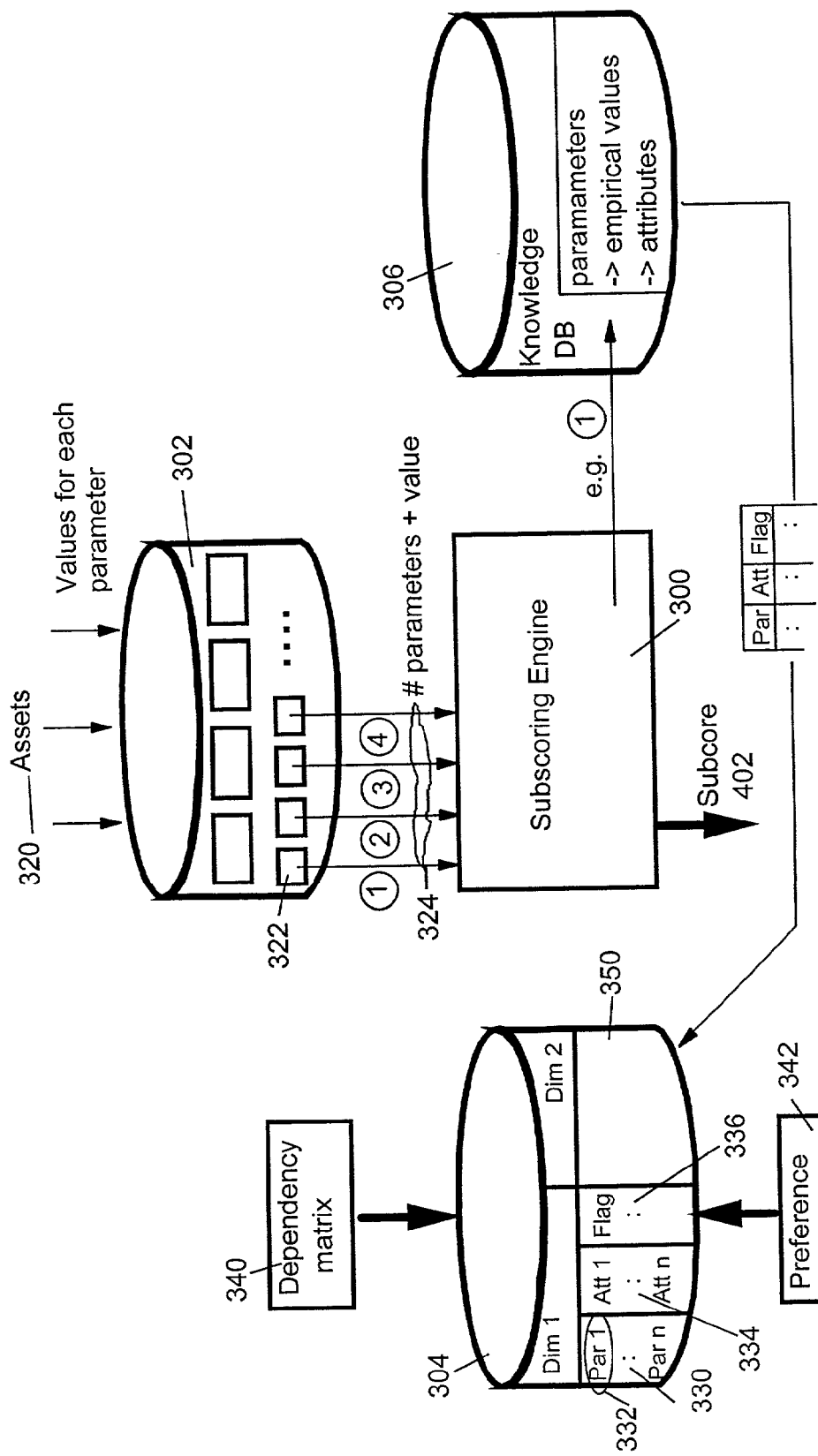
FIG. 5 is a detailed view of the subscoring stage depicted in FIG. 2.

The subscoring stage shown in FIG. 5, in the preferred embodiment, consists of a subscoring engine 300. The subscoring engine 300, in the present embodiment, is connected with three databases 302-306. For the functionality of the contents of these databases 302-306 it is also referred to the related parts of the preceding and following description. However, the three databases 302-306 are to be understood as being only logical ones and thus, for instance, can be implemented physically in only one database management system. The first database 302 has stored clustered or filtered asset information 320 as described in FIG. 4, the input to that database 302 being the researched asset information 322. An examplary filtered asset information are parameters 'market position' and 'type of business', e.g. supplier of automotive accessories. From the filtered asset information 320 the determined parameters and corresponding values are transferred 324 from that database 302 as input parameters to the subscoring engine 300.

The second database 304 has stored, for each determinant or dimension, respectively, tables 330 (or alternatively only one table) for all the parameters 332 of the underlying evaluation model together with corresponding attributes 334 and corresponding flags 336. These tables are calculated, as a first inut, based on parameter dependency information gathered from the predescribed dependency matrix 340 and the predescribed preference (weighting) matrix 342.

Another particular input, namely the parameters, flags and attributes 350, are transferred from the third database 306, a knowledge database containing empirical values for each of the parameters which are translated into relating parameter attributes. The empirical values are gathered recursively. The knowledge database for instance can be an expert system which automatically performs the following exemplary evaluation steps. It is assumed that the knowledge database of the expert system comprises a relation automotive supplier->branch with high competitive intensity or potential. As a consequence the attribute for that parameter would be set on 'differentiated' or 'medium'. But if the parameter 'position in the market' for the particular company under evaluation is 'market leader' then the dependency flag has to be set or checked accordingly.

It is emphasized that the subscoring engine 300 evaluates each determinant or dimension separately in order to provide subscores for each determinant.

FIG. 6 shows a scoring stage of the preferred embodiment. It comprises a scoring engine 400 which can be implemented separately from or in unit with the above described subscoring engine 300. The input to the scoring engine 400 are the subscoring results 402 revealed from the subscoring engine 300 and, in addition, any existing interdependencies between different determinants are taken into consideration by means of the dependency matrix 340. As described hereinafter in more detail, in the preferred embodiment interdependencies are resolved using a rule-based consistency check together with corresponding score changes dependent on the result of the scoring evaluation. As further input to the scoring engine 400, a preference matrix 342 provides weights for multiplying each of the scores of each of the determinants.

The following is an example of a rule-based evaluation by the scoring engine 400 using the dependency information provided by the dependency matrix 340. It is assumed that the market position and financial position of a company is known. In such a case, the scoring engine 400 exemplarily performs the following check and corresponding change of a subscore:

IF subscore (financial position) is between 1 and 4 and IF subscore (market position) is between 9 and 10, THEN set subscore (market position) minus 2.

It is noteworthy that the threshold values for the subscore can be determined empirically in advance thus enabling an automated scoring process. The output of the scoring engine 400 is a final score 404.

In the dependency matrix depicted in FIG. 7, the x- and the y-axis comprise all determinants of the underlying evaluation model. Hereby fields of the type determinant M on x-Axis versus determinant M on y-Axis, e.g. Market Position-Market Position, are crossed out since not revealing any information about dependencies. Within this matrix three types of dependencies are shown. The X-Type exhibits that the X-Axis determinant influences the Y-Axis determinant. Vice versa the Y-Type states that the Y-Axis determinant has an impact on the X-Axis determinant. In case of mutual dependency on each other the Z-Type is used.

Referring to the legend depicted underneath the matrix, the degree of dependency will be added within the preferred embodiment using numbers like 1—little dependency, 2—significant dependency or 3—strong dependency. Thus following dependency combination could occur: 1X, 2X, 3X, 1Y, 2Y, 3Y, 1Z, 2Z, 3Z. Exemplary the X-Type between the X-Axis determinant 'Fundamental condition' and the Y-Axis 'Investors appetite' is interpreted as follows: If the fundamental condition is assessed very positive meaning e.g. that the economic cycle is in its boom-stage, the investors appetite will improve towards High Yield Corporate Bonds, because (1) bonds as an asset class become more attractive in general due to e.g. an increasing interest rate level, (2) the default risk of corporates perceived by investors is very low, etc. In this case, a low, medium or high level of investors appetite towards High Yield Corporate Bonds will not influence the economic cycle (fundamental condition) at all.

Another example for the Z-Type is the mutual dependency of the Fundamental and the Technical Condition. Both depend each other in a strong manner. If the economic cycle (fundamental condition) is in a good condition then the performance in terms of risk-adjusted return (technical condition) of High Yield Corporate Bonds is very likely to be good as well. On the other side, a good performance of bonds increases the likelihood for using the bond market for financing purpose thus directly enforcing investments which lead to further growth.

The following is an evaluation example using the determinant dependency information provided by the dependency matrix:

IF ABS(subscore (dim n)–subscore (dim m)) is greater than a given threshold THEN the score is decreased by MAX(subscore n, subscore m).

FIG. 8 shows a preference matrix 342 exemplarily for four determinants A-D in order to illustrate the underlying principles of that matrix. In this matrix 342, fields of the type X-X are crossed out again. In addition, one half of the matrix is crossed out too as being redundant since tuples like AB and BA comprise the same information content.

Every field of the preference matrix 342 provides a comparison between two determinants. For every remaining field, the respective dominating determinant is inserted in that field. In the filed C-A the input determinant is additionally weighted by a factor of 3 which means that A compared with C is regarded very dominant. Having filled all fields of the matrix, all entries are summed up thus revealing, in the present example, 5 times A, 2 times D and one times C. As a result, the weighting factors as represented by the relation of n times divided by 8 for the different determinants are 0,625 for determinant A, 0,25 for determinant D and 0,125 for determinant C.

A thorough reader should have noted that the weighting factor for determinant B is zero. As a consequence, that determinant will not count in the final score. But it is emphasized that such a result for one determinant is very unlikely for a greater number of determinants as the 12 determinants proposed by the investment decision model according to the preferred embodiment.

In FIG. 9 a typical recommendation 22 based on a resulting score value is illustrated. In case of the resulting final score being lower than 20% of a maximum score, under no circumstances 'NO INVESTMENT' is recommended. In case of the score between 20 and 40%, the recommendation is 'NO INVESTMENT' too but an individual review of the score results, e.g. by analyzing the modified radar scheme described in detail in the following, is necessary. In case of a relatively high score between 40 and 80% the recommendation is 'DO INVESTMENT', but as in the previous case, a deeper look inside the results, in the present embodiment in form of a personal summary of the results, is required. Finally, in case of the score lying between 80 and 100%, the recommendation is 'STRONGLY DO INVESTMENT', i.e. that the recommendation must be executed under no circumstances without any further evaluation work to be required.

FIG. 10 shows a modified radar scheme for presenting the subscores resulting from an evaluation process as described beforehand to a user, e.g. by way of a graphical user interface (GUI) or a printout. The radar scheme is used in those cases discussed in the last paragraph where further individual review of the scoring results is recommended in order to understand the entire evaluation results and to enable the user to modify one or more of the subscores thus changing the final score result accordingly.

The shown radar scheme or diagram consists of a radar- or star-like coordinate system, comprising twelve dimensions 500, 502, 504, 506, etc. in the present embodiment. Each dimension relates to one determinant of the twelve determinants of the present underlying evaluation model. The outer circle of the scheme represents the maximum possible subscore values and is 100% in the present embodiment. The medium circle 510 accordingly relates 50% of the maximum subscore and the center 512 of the scheme to 0%. All determined subscores like subscore 514 are put into that scheme using the respective subscore values or the percentage of these values compared with the maximum possible value.

The radar scheme gives a very helpful overview of the distribution of subscores that can be used to understand the final score result much better. At first the subscores within the radar scheme are not weighted using the preference matrix (FIG. 8). This enables a kind of bird's-eye view of the preliminary results before the final scoring has been done. Basically the input for the scoring becomes more visible and clear and can be interpreted individually by an analyst. This can be of interest particularly in case one dimension is weighted as insignificantly and thus does not impact the final score very much, but is perceived from the analyst as interesting enough perhaps to change the investment decision from a personal point of view.

In the present example, two subscores 516, 518 are exhibited for the dimension 507. While the subscore 516 is the final output from the scoring engine the subscore 518 shows the value before the scoring engine calculated the subscore. Thus the value 518 is the value obtained without any correction performed by the scoring engine based on the dependency matrix (FIGS. 6 and 7). As mentioned above it could occur that two dimension depend on each other and because the difference of the subscores of these dimension was higher than a given threshold. As a result a correction performed by the scoring engine was undertaken. By means of the shaded area 520 one can better imagine how big the effect has been. From that the analyst can gain additional insights.

The radar scheme can be used for another purpose as well. The subscore 516 could represent the result of a given Scenario X while the subscore 518 is the result of Scenario Y. Carrying out such a scenario analysis the shaded area 520 visualizes the differences in the result very powerful. Another use would be the time comparison on a year-to-year basis, etc. In this case the subscore 516 could show the current status while 518 represents the future status. Using the radar scheme this way comparisons over time can be visualized.

Analysis for the European HY Corporate Bond Market 2000

In the following, an exemplary high yield (HY) analysis is described in more detail where the European HY market is analyzed. At first, market structures, players and forces are examined and compared to the US market. Following that the influence of culture on decision making in general, and on the European HY market in particular, will be discussed. Thereafter, other external trends affecting the HY market will be identified.

It is assumed that the analysis revealed the key drivers within the European HY market. They are listed below in order of their importance:

Institutional investor's appetite pulling the market;
Investment banks pushing the market;
Underperforming EM HY bonds supporting the market;
Companies' desire to diversify debt financing supplying the market.

Institutional investors are increasingly interested in putting more HY issues in their portfolios or in launching specialized HY mutual funds. Here it is important to notice that the investment approach differs significantly. Pension funds and insurance companies are long-term orientated following a 'buy and hold' strategy. They are curious about these new HY issues and try to gain first experiences with this new asset class. Depending on the experiences made they will further increase the proportion of HY bonds held in their portfolios. Banks, particularly proprietary desks, and mutual funds, especially HY mutual funds, trade more aggressively trying to find undervalued issues in order to beat the market. The required credit research expertise is still under development. This results in a focus primarily on their home markets. Their appetite for HY bonds is still nationally focused, whereas the experienced US HY investors already recognised the rewards of the European HY issues when adding them to their portfolios. Future HY issues will remain to be addressed for US investors as well, in particular by USD denomination etc.

Like previously mentioned the investment banks push the market as this business proved to be very profitable. The underwriting fees are about 5 times higher than for normal bond issues. This will stay for a while considering the expected fast market growth. The US HY market with fierce competition and elusive underwriting fees supports the focus of investment banks on Europe. This intensity of competition could happen in Europe as well caused by European investment banks fighting for their home markets and the general global consolidation trend in investment banking. Still, the European HY market is dominated by American investment banks that have reputation and HY expertise as competitive advantage.

As pointed out EM HY debt is a direct substitute for the European HY bonds. Investing in EM HY corporate or sovereign bonds means bearing additionally political risk but could be more powerful in risk diversification due to a lower correlations. Finally, the investors decide where to invest.

The Asian crisis 1997 spreading out to Russia and Latin America in 1998 clearly supported the growth in the European HY market to a certain extent. Nevertheless, the EM conditions appear to have turned around again. Because European HY mutual funds, for example, defined Eastern European debt as part of their investment universe, investing in EM could become fashionable again.

Historically, European companies depend to a high degree on bank loans. In times of shareholder value the companies' desire is to diversify debt financing in order to lower their cost of capital and gain independence of mostly conservative banks. In addition, high growth companies could not get enough bank loans to finance their internal growth. Further, M&A and LBO activities in response to globalisation pressures and expansions depend heavily on the access to the capital markets. Whilst the equity market is often in the centre of interest the importance of the HY debt market will increase. Pulled by investor's demand, pushed by investment banks and forced by the mentioned general trends more and more companies will take an issue of HY bonds into consideration. This is also necessary, because the European HY market structures are still immature. So far, high-growth companies, which can be called innovators and early adopters, taped the HY market in a mature manner. It is important that more solid cash-flow middle-sized companies use the European HY market to provide the required diversity, deepness and liquidity.

As pointed out the market is still the sum of nationally dominated markets. In the UK HY bonds were issued earlier and the whole market is developed further than continental European HY markets. Whilst in the UK the market is already in its growths stage the rest is still in its introduction stage of a market life cycle model. Amongst the continental European HY markets as depicted in FIG. 4 the Benelux are best developed whilst there are no significant differences in France, Germany and Italy. As a result the UK and German HY market will be considered separately using the evaluation model introduced last chapter.

Looking at the HY issues the UK market already consists of companies that are leading in their industries or big challengers with good prospects. Their financial position is good but worse to the more conservatively financed German companies. Whilst the few German issues are too small to support liquid secondary markets the UK issues are bigger.

Moving on, both economies are on the edge to stronger future growth hopefully leading to healthy profits and low bankruptcy rates in the near future. On the other hand, inflation and interest rates are likely to rise increasing the interest rate risk. On balance the fundamental economic condition is more neutral than supporting extensively the HY market growth. In regard to the technical conditions recent research about correlations and risk-adjusted returns favours the European HY market development, especially for US investors. Germany and UK are both well-developed countries offering a lot of certainty to investors regarding capital markets.

Investor's appetite is extremely high in UK. All institutional investors are keen to put HY bonds into their portfolios and wary about loosing this opportunity. Examining the media a trace of hype pro HY can be noted. In Germany HY bonds are discussed as well but more critically. Nevertheless, HY bonds are in fashion also in Germany. As a result HY issues are easy to sell to the investors due to heavy demand. At the moment, competition amongst investors is fortunately low ensuring that proper credit research is most important for decision making. Further, investors are in such a good position that they can demand issues perfectly to suit their needs. In addition, the low interest rate environment, convincing to take more risks, and the recent EM Crisis, still not forgotten, facilitate the European HY market.

Looking at the supply side bank loans are attractive benefiting from the low interest rate environment. Unfortunately, banks are quite restrictive to finance risky operations. Thus, HY bonds are getting more interesting. Because the risk premium payable for HY bonds is larger than for bank loans, at least in Germany, companies able to raise a bank loan prefer this in order to gain lowest cost of debt. This causes the current unattractiveness of HY bonds amongst companies. Competition between issuers is only known in the telecommunication and media industry. Here, their prospects are so good that it will not harm the health of the European HY market. Last but not least, investment banks and their interests play a pivotal role. Whilst in the UK the potentials are fully recognised some big German banks just prepared to enter the market.

As mentioned earlier, the key drivers are investor's appetite, investment banks, and investor's substitutes, and their extent to facilitate the European HY market. In summary the market is very much driven by Pull-factors of investors and the investment banks supported by the good technical standing of European HY bonds.

Derived from the analysis undertaken the following trends are key for the future development of the European HY market alone and intertwined. They are ranked in order of importance.

Continuing Americanisation of European capital markets;
increasing importance of portfolio diversification amongst institutional investors;
enlarging globalisation pressures and expansion for European companies;
improving Business Cycle across Europe.

The continental European investors will survive to be different compared to the Anglo-Saxons. Even if converge tendencies occur the lower readiness to take risk will last. By that the launched HY mutual funds will not reach the size of their American counterparts in absolute and relative numbers. Further, the proportion of HY bonds within the portfolios of institutional investors will stay smaller. Generally speaking, demand for HY bonds will be less.

On the other hand, European companies will not give up their stakeholder orientation completely. Whilst they have to take the shareholders interest more into consideration they perceive the consensus and coalition building capabilities as superior compared to the American way of doing business. In the end the relationships to banks and bank financing will continue to be very important. This will result in less supply for the European HY market compared to the US HY market. Examining both the demand and supply side the European HY market will remain to be smaller in proportion to the overall capital markets than the US HY market, which comprised about 7% in 1999.

Further, the European mindset will prohibit a possible collapse of the European HY market similar to that of the US HY market in 1989/90. HY bonds will not be that aggressively used to finance M&A and restructuring activities. In addition, it can be assumed that political regulation would be not that radical and more the result of longer public discussion, which gives generally more time to adapt to new regulations. And most important, a large quantity of scientific research and experiences have been carried out and accumulated, which give the market participants a greater awareness and understanding. This should help to prevent another market collapse.

As the second most important trend was the increasing importance of portfolio diversification amongst institutional investors identified. In the end, HY bonds will be established as a separate asset class having very favourable risk-return and correlation characteristics. Precondition for this scenario is the development of a sizeable investor base, which experiences steep learning curve effects on the credit research side. Therefore, they need to focus on the common and distinct features of European HY, from both a credit risk and technical standpoint. This raises the stakes for investors and intermediaries to develop their in-house capabilities as well as their sensitivity to the potential volatility of this market. If the European HY market becomes deeper and more liquid, offering a good mix of issuers and industry groups then it will constitute to a distinct asset class that could be a viable stand-alone subset of global HY. This issue is part of the external trend towards more diversified capital market, covering the needs of more diversified targeted investors, and a greater inter-marketplace competition world-wide.

The issue of globalisation pressures and expansion for companies was already discussed. In Europe the Single European Market and the EMU developed the foundations of one wholly integrated European marketplace. In reality, the integration will take a while. Whilst the framework for doing business is in the process from country-based to pan-European-based the industries are still dominated by national champions. As the integration process proceeds companies of all countries and industries face changing market structures, players and forces. In order to survive they have to reposition themselves. Most apparently this process could be studied when considering the deregulation of the telecommunication industries across Europe. Nowadays, former state-owned monopolist such as Deutsche Telecom or France Telecom expand their business aggressively via M&A activities. Others like Telecom Italia become victims. This process is accelerating in Europe and will drive the European HY market even more in future. Apart from the telecommunication sector the energy sector currently experiences similar changes and in future even sectors like health care and education are likely to be effected. Whilst the development in Europe will be in the centre of interest this process is apparent on a world-wide scale.

Last but not least, it is predicted that the European economic condition will improve over the next years. Talking in terms of GDP growth the expected average EU growth rate will rise from 2.0% in 1999 to 2.9% in 2000. In America just the opposite is the case. The GDP growth will slow down from 3.7% to 2.5% (Berliner Zeitung Oct. 27, 1999:2). As described earlier in times of robust economic activity, default risk in HY bonds is not of primary concern. Because HY bonds behave more like equity during periods of economic recessions.

Looking at the trends influencing the European HY market over the next years an HY virtuous circle seems to have started off. Greater interest resulted in larger demand that required bigger supply and led to a good performance. This again increased interest in HY bonds and so forth.

Using again the evaluation model, the future development of the German HY market as representative for continental Europe is as following. Within the HY market a shift from Pull-factors (demand side) driving the market to Push-factors (supply side) will take place. HY bonds are getting more and more interesting for investment banks and companies, whilst the threat of substitutes particularly through the once more booming EM increases and limits the attractiveness of European HY bonds. Further, the risen interest rates in Europe lowers the search efforts for high yield higher risk investments compared to investment-grade bonds etc.

Still the excellent economic condition across Europe, the advanced integration of Europe's capital markets and tempting new HY offers support an overall continuous growth of the HY market. In line with the unbroken convergence of the European and American credit capital markets the European HY market could reach an outstanding volume of 100 bn in 2004 implying an annual growth rate of 25%.

The following Table depicts an assumed Size of the European HY market in 2004 (Sources: Deutsche Bank 1999:21; Mercury Asset Management, IFR Conference, London, May 5, 1999)

| In bn | Euro Bond Market | Euro Corporate Bonds | European HY Bonds |
| --- | --- | --- | --- |
| Outstanding April 1999 Proportion in the US 1999 | 3,300 | 165 (5% of 3,300) 27% of Total Bonds | 33 (20% of 165) 26% of Corporate Bonds |
| Assumed Growths p.a. | 5% p.a. | | |
| Assumed Proportion | | From 5% to 12% | Remains 20% |
| Outstandings 2004 | 4,200 | 500 | 100 |
| Resulting Growth Rates | | 25% p.a. | 25% p.a. |

Having examined the key drivers and future trends, which in the present scenario promise a good future, it is important to notice the following possible limitations:
Political Interventions;
Poor acceptance at solid middle-sized companies;
Some big default stories;
Unhealthy competition amongst rating agencies;
Excessive investment banks push.

The collapse of the US HY market 1989/90 was partly due to 'antijunk rhetoric' and legislation in response to hostile takeovers. This could happen in Europe as well. At the moment, no takeover regulation only a voluntary codex exists in Germany, but is planned for next year. Looking at the recent takeover offer by Vodafone-Airtouch for the German company Mannesmann in November 1999 exhibits the threat of unfortunate political intervention. The offer is perceived by the public as hostile and top politicians like the German chancellor Mr.Schröder already announced that German public interest would be endangered. Regulation against hostile takeover or requiring more restrictive charters of institutional investors in order to protect retail investors could seriously limit the future growth.

Middle-sized companies are still the backbone of Germany's economy and are very strong in other European countries as well, i.e. Italy. These companies could simply not be interested in giving corporate control away. Using the capital market would require publicity about strategy and financial issues. Most solid cash-flow companies are family-owned for generations and their top management do not like public discussion of strategic issues. Further, it would demand the establishment of professional investor relations departments. This makes this alternative in the short to medium term much more expensive compared to bank loans.

Like previously stated the European HY market is still immature, too small to enable investors to diversify sufficiently. This makes it impossible to manage European HY bonds in a proper portfolio context. In this situation it is all too clear that the failure of one or more HY issuer, for whatever reason, could still sour the whole market, causing spreads to widen and sparking a flight to quality. This is what happened during the US HY market collapse as well. Some authors even suggest that the future of the European HY market even hinges on the level of defaults in the US market to a certain extent.

Danger could arise from rating agencies as well. The capacities of the American rating agencies could prove to be insufficient to properly cover European companies. In addition, there are some doubts whether the American agencies are able to adapt their analysis to the distinct European environment. It is widely agreed that Europe need its own agency. Media-conglomerate Bertelsmann, for example, already announced that it will enter the rating business with a strong focus on Europe. Together with Fitch IBCA (New York/London) it will fight off the big American rating agencies Moody's and S&P. To be successful partners are found in the Deutsche Börse AG and talks with large banks are under way as well (Spiegel, Oct. 11, 1999, pg. 125).

Whilst it will take some years to establish, the European rating agencies could increase competition, which could endanger the quality of their research and/or mixes up market participants in search of a proper measure reflecting the risk associated to HY bonds.

The increasing intensity of competition amongst investment banks could damage the in-house HY capabilities. This is getting worse when the European HY market will achieve the critical mass. Then a migration of the market from information scarcity to information overload takes place, representing a real management challenge. In order to cope with that, a more sophisticated data, information and market driver framework has to be established that backs the decision-making process. If investment banks push the European HY market too hard then the issuance will inevitably experience losses in quality.

Fortunately, investment banks are aware of the importance of their reputation as a source of competitive advantage.

Last but not least, some professional investors exhibit the following investment rationale that does not favour the European HY market. "Despite the fact that demand for European junk bond outstrips supply, not all professionals are high on them. If you are a high-risk investor, I would suggest investing more in equities than bonds—including high yield bonds—because the environment in which high yield bonds do well is likely to be one in which equities also do well . . . and if equities do badly, you would expect high yield bonds to underperform." (Wall Street Journal Europe Jun. 14, 1999)

The above-mentioned factors could create a bad publicity circle, where some default stories would increase the threat of unfortunate regulations. This would lower interest in HY bonds caused by growing risks. The resulting decreased demand or even cash outflow would hit the performance amongst other things.

Starting point for the proposed evaluation model is that many perspectives, players and forces have to be considered in order to evaluate the HY market. This generic model tries to capture all important determinants influencing the HY market. It supposed to be a checklist and scoring model primarily for the strategic analysis. It is possible to weight the different determinants beside the individual assessment of each one on a scale from 1 to 10. The lowest number 1 is reserved only for the biggest limitation to a positive development of the HY market. Number 10 expresses strongest facilitation for a prospering HY market. The middle of the scale, number 5, represents a neutral status regarding the HY market.

Evaluation Model Determinants & Parameters

The following table illustrates the naming of the proposed HY evaluation model and explains the determinants of the different determinant of the market evaluation model in greater detail:

| INTER-LINKED AREAS | DETER-MINANTS | EXPLANTION OF DETERMINANTS | PARAMETERS |
|---|---|---|---|
| INDIVIDUAL HY ISSUE POSITION | Market Position | The standing of the company relative to its competitors. It refers to the current situation as well as the future prospects of the corporation. Last but not least the firm should have specific capabilities and competencies, which ensure at least the survival. Very important in providing a competitive advantage, for example, is the brand or reputation of that firm. | Position of the companies in their market (leaders, challengers, followers) Average standing of the companies relative to its competitors Type of business Core Competencies & Capabilities Source of Competitive Advantage Unique Selling Proposition Management quality |
| | Financial Position | Cash Flow Generation, ability to deleverage, amortisation schedules, quality and saleability of assets, priority of debt in the capital structure, capital requirements, company's life cycle, liquidity etc. are important considerations to assess the financial position of the company. Here again the position is to compare with the competitors and comparables. The questions have to be asked for the future as well. In order to assess the firm properly their goals as well as the track record and reputation of the management should be examined carefully. | Numbers/Ratios: Balance Sheet Profit-Loss-Account Economic Value Added Shareholder Value, Market Value Liquidity, Cash Flow Comparative Financial Analysis Numbers/Ratios-Year to Year Comparison Comparison to Competitors (Benchmarking) Static and Dynamic Ratios |
| | HY Bond feature | This means a covenants review and other factors affecting the trade, e.g. size of issue, number of market makers, duration, rating and relative yield spreads. | Covenants information about HY issues Seniority vs. Subordinated (of collateral), callability, Zero coupon bonds, covertible feature, covenants limiting debt, cash outflows, asset sales, Other features Nominal Interest Rate Rating size of issues, Yield Spreads to other Bonds Duration |
| MARKET AND INDUSTRY CONDITION | Fundamental condition | Here the fundamental economic of a geographical market and/or the industry is meant. It is defined by their stage in business cycle such as GDP growth, unemployment rate, interest rate level and trends, inflation etc. If applicable currency risk plays an important role too. Analysing the fundamental structure, intensity and nature of competition of the industry is essential as well to determine the sector risk. | Key economic indicators of the main regions in world over last years and outlook growth rates of GDP, real interest rates, inflation, nominal interest rates, stock market value, average price/ earning ratio of big indices |
| | Technical condition | The conditons in a technical sense refer to the attractiveness of the market/ industry compared to other markets/ industries. It considers the different interest rates, yield levels and their volatilites. Questions like what changes have been caused by rumours, | Risk/Return/ Performance Numbers . . . different HY indices (rating BB, B, CCC, D) . . . different geographical regions (Europe, US, EM) . . . different industries Risk-adjusted Return/Sharpe Ratio Default rates of |

| INTER-LINKED AREAS | DETER-MINANTS | EXPLANATION OF DETERMINANTS | PARAMETERS |
|---|---|---|---|
| | | large capital movements by certain players, or trading strategies of certain market participants have to be answered. It is all about correlations, portfolio management and general global capital formation | bonds, categorised after ratings (x % for A, y % for BBB, etc.); Annual High Yield Default Rates in the US and in Europe Probability of Default over 1 year, 5 year, 10 years Debt recovery rates categorised for asset classes and sub-assets Have there been any bigger Default Stories in Europe over the last 2 years? Transition matrix of ratings (up-grades, down-grades) Volatility of Returns (different time frames, eg 1 year and 2 year) Highest annual return Lowest annual return ... different HY indicates (rating BB, B, CCC, D) ... different geographical regions (Europe, US, EM) ... different industries Portfolio Diversification Correlation Numbers ... different Bond indices (Governement bonds (short-term, long-term), Corporate Bonds, HY) ... different asset classes (indices) ... different countries (government bonds in different countries (Europe, US, Emerging Markets), etc.) |
| | Political condition | The extent of political risk can be identified asking for the political and social stability in a country, law and order, co-operation between the branches of government, fiscal prudence, distribution of wealth, respect for foreign investors and international law, history of honouring debt | Current International/Political risk assessment information about political and social stability of substitutes, history of honouring debt obligations, law and order, respect for foreign investors and international law |

| INTER-LINKED AREAS | DETER-MINANTS | EXPLANATION OF DETERMINANTS | PARAMETERS |
|---|---|---|---|
| | | obligations. | |
| DEMAND STATUS | Investor's appetite | Appetite summarises all soft factors influencing the demand. Sometimes there are fashion or trends even in the area of financial markets. HY bonds are comparatively new and there appears to a still increasing interest within the financial community to discover this new investment alternatives. Investment culture is external setting of investors appetite. | Perceptions and fashions amongst investors New hypes (specific investment products, which are in) Investment cultures in Europe (statements, studies to changing condition of European Capital Market) Staff origination of Investment banks, institutional investors Approaches to invest (Top-down, bottom-up, random, indices, value investing, behavioural, fundamental driven, technical driven)-different from country to country?, differences US to Europe General trends (Risk society Germany, housebank principle diminishing, capital market structures of US and Europe still converging) Trends-Statement, Studies (Finance Theories News, Breakthroughs) |
| | Demand Competition | It stands for the vertical competition. Whilst institutional investors as financial intermediaries compete each other for customers it suppose to represent their bargaining position against investment banks too. | Ownership of High Yields (Mutual Funds, Insurance Companies, Pension Funds, Hedge Funds, Broker Dealers, Foreign Investors) in Europe/America; across different countries in Europe Relation between HY issues owned by institutional investors vs. Retail investors (directly and indirectly via funds) General distribution of financial assets amongst different countries (USA, UK, France, Germany, etc.) Numbers about the HY issuance distribution (distribution channel for HY issues, online-distribution got started?) Distribution channel for funds Numbers about quantity, volume & |

-continued

| INTER-LINKED AREAS | DETER-MINANTS | EXPLANTION OF DETERMINANTS | PARAMETERS |
|---|---|---|---|
| | | | investment strategies of HY funds (numbers of new launched funds); aggregated numbers for the last years; options about future development Facts & Opinions about other funds, which could invest in HY (increased their proportion in HY?) Is their still a lack of credit analyst infrastructure' at institutional investors (dedicated HY teams in banks or not? Role (influence, importance) of US HY investors for European issues Opinions about the market drivers from insiders Mutual fund inflow and outflow characteristics (especially aggregated numbers for European countries) Forward calendar of HY issue (considerations of supply/demand condition) Trends-Statments, Studies (steady increasing institutionalisation of investors) Similar Numbers about the US High Yield Market and other HY Markets |
| | Demand Substitutes | Investor's substitute and their relative attractiveness is meant. Like earlier mentioned it comprises close substitutes such as the HY bank loans and EM debt as well as the standing of the equity markets. | Bonds of Emerging Market (Countries & Corporates) Relative price-performance or risk-return characteristics of HY bonds compared to invest-ment substitutes/ alteranatives for investors: . . . Eastern Europe . . . Latin America . . . Asia figures/numbers about size, inflow/outflow, past performance, outlook new entrants in terms of new financial products |
| SUPPLY STATUS | Supply Substitutes | Company's sub-stitute refers to the relative attract-iveness of issuing HY bonds compared | Relative price-performance or risk-return characteristics of HY bonds compared to finance |

-continued

| INTER-LINKED AREAS | DETER-MINANTS | EXPLANTION OF DETERMINANTS | PARAMETERS |
|---|---|---|---|
| | | to other means of financing, e.g. bank loans or equity IPO's | substitutes/ alternatives for companies Facts and opinion about the capital market securities such as HY bonds in relation to bank loans, lever-aged & syndicated loans: . . . how much % of companies use capital market to finance themselves (year over year comparison) (Top 100 companies across Europe etc.) . . . banking policies regarding corporate finance and methods to determine interest rate for loans (risk premium) . . . issuance of bank loans vs. Corporate bonds (and High yield) Trends-Statment, Studies (continuously on-going securi-sation and disintermediation) High Yields vs. IPO to refinance (Pros & Cons) Companies Management Pro and Con Reason for using Capital market instead of bank relationship . . . diversification, publicity etc. vs. . . . cost, investor relation, indepen-dence etc. |
| Supply Competition | The bargaining power of companies against investment banks as part of vertical competition is placed here. Generally speaking, the more companies would like to place a HY bond the greater the competition to get the best invest-ment banks. | Composition of European HY market (across European countries and overall) . . . By industry, different types of industries (high-tech, growing vs. Solid Cash-flow) . . . By country . . . rating categories BB, B, CCC, D . . . categories like fallen angels (former investment-grade), rising stars. Largest European HY issuers (lead list) Use of issue money (acquisition, repay Acquisition debt, leveraged buy-outs (LBO), internal growth, general refinancing); |

-continued

| INTER-LINKED AREAS | DETER-MINANTS | EXPLANTION OF DETERMINANTS | PARAMETERS |
|---|---|---|---|
| | | | Merger-and acquisition related debt |
| | | | New trends (direct placement on the capital market via Internet; Does big companies build up their own corporate bond issue teams as counterparts to banks?)-balance of power? |
| | Investment banks | The appetite of investment banks to do profitable business is covered in this dimension. It is determined by the intensity and nature of competition or rivalry amongst investment banks. Further, the threat through the entry of new competitors is integrated here as well. | Growth of European High Yield Market Number of New Issues/Sizes of Issues p.a. Outstanding market volume (issues, companies) Percentage of HY issues/volume compared to all Corporate Bonds Predictions from Investment Banks about further development in 2001 and afterwards Similar Numbers about the US High Yield Market Investment Banks/ Bookrunners Lead list of Investment banks concerning HY (European currencies/USD nominated/Total issues/volume) Lead list across European countries (Investment banks structure across Europe (how looks the market like in UK, Germany, France, Italy, Spain), always the same players, differences,) Underwriting fees of Investment banks along the dimension rating/maturity Concentration ratios amongst investment banks Size of corporate bonds business teams in investment banks (quantity; lay-offs, transfer from America to Europe) New entrants to the market-strategies, efforts, success stories; (What about second/third tier investment banks insurances, new concept (Allfinanz), |

-continued

| INTER-LINKED AREAS | DETER-MINANTS | EXPLANTION OF DETERMINANTS | PARAMETERS |
|---|---|---|---|
| | | | financial consultancies (PWC, KPMG, etc. Potential threats to decrease Barriers to entry (regulation, trends, globalisation, etc.) Trends-Statements, Studies (regarding technological innovations and their influence on financial markets) Similar Numbers about the US High Yield Market |

While the above provides a full and complete disclosure of a preferred embodiment of this invention, equivalents may be employed without departing from the true spirit and scope of the invention. Such changes might involve alternate criteria or an alternate structural arrangement of the aforedescribed embodiment. Therefore the above description and illustrations should not be construed as limiting the scope of the invention which is defined by the appended claims.

The invention claimed is:

1. A method for computer-assisted generation of investment decisions and/or strategies in the field of corporate bonds including high yield (HY) corporate bonds, comprising:

carrying out computerized evaluation of capital market financial assets, including:
obtaining investment relevant market business information;
filtering the obtained market business information in order to separate said obtained market business information into four interlinked areas, wherein the first of said four interlinked areas relates to individual HY issue position, wherein the second of said four interlinked areas relates to market and industry condition, wherein the third of said four interlinked areas relates to demand status, and wherein the fourth of said four interlinked areas relates to supply status;
processing said filtered market business information by a subscoring process, wherein the subscoring process includes comparing values of a number of parameters with corresponding benchmark values provided by a knowledge database and assigning to each parameter a subscore; and
processing the results of said subscoring process by a scoring process to provide a score corresponding to an assessment for an investment decision, wherein the scoring process includes calculating a score based on said determined subscores and a predetermined dependency matrix providing dependencies between predefined determinants and a predetermined preference matrix providing multiplicators used for weighting said determined subscores, and
wherein said four interlnked areas comprise twelve determinants, each determinant having an associated score, and wherein the determinants of said first interlinked area comprise market position, financial position and HY bond features, wherein the determinants of said second area comprise fundamental condition, technical condition and political condition, wherein the determinants of said third area comprise investor's appetite, demand competition and demand substitutes, and wherein the determinants of said fourth area comprise supply substitutes, supply competition and investment banks and wherein each determinant is evaluated using a radar scheme where each determinant is represented by one dimension of said radar scheme, said radar scheme consisting of a radar-type coordinate system, comprising a multitude of dimensions, each dimension relating to one of said determinants, and wherein a recommendation for an investment decision is provided based on the associated score.

2. Method according to claim 1, wherein said first phase of filtering comprises two levels, a first level where assets and asset owners within the market in view of the context of the underlying market compared to other markets are determined and clustered into one of four interlinked areas, and a second level where, based on the output of said clustering, a low level market analysis is performed.

3. Method according to claim 2, wherein said asset information is assigned to one of a number of preferably four containers which contain assets and asset owners within the market in view of the context of an underlying market compared to other markets for an underlying evaluation model.

4. Method according to claim 1, wherein an outer circle of said radar scheme represents the maximum possible subscore values, a medium circle represents an intermediate subscore value and a center of the radar scheme represents a zero subscore value.

5. Method according to claim 1, wherein said scoring process consists of the following process stages: A first stage where determinants to consider are defined and existing dependencies between said defined determinants are identified; a second stage where said determinants are weighted whereby defining the relative importance of each determinant and possible score ranges; a third stage where said defined determinants are analyzed and scored, information concerning the above mentioned criteria is collected and then a score for each determinant determined, the determined scores are multiplied times the defined weights of each determinant and finally the scores of each determinant are added to obtain an overall score; and a fourth stage where all score intervals are defined, sets of possible recommendations are determined and the possible recommendations are linked to intervals.

6. Method according to claim 5, wherein said dependencies between said determinants are processed using a dependency matrix.

7. Method according to claim 6, wherein said dependency matrix comprises two dimensions X, Y, each direction X, Y of said table comprising all determinants of the underlying evaluation model, wherein providing three types of dependencies, an X-Type stating that an X-Axis determinant influences an Y-Axis determinant, an Y-Type stating that a Y-Axis determinant has an impact on an X-Axis determinant, and a Z-Type stating a mutual dependency on each other.

8. Method according to claim 5, wherein said weighting is based on a preference matrix wherein each determinant is weighted with each determinant.

9. A computer program product stored on a computer usable medium, comprising computer readable program means for causing a computer to perform a method according to claim 1 when said program is run on said computer.

10. A data processing system programmed to carry out the steps of claim 1.

* * * * *